United States Patent
Rao et al.

(10) Patent No.: US 11,209,522 B2
(45) Date of Patent: *Dec. 28, 2021

(54) METHOD AND APPARATUS FOR FMCW RADAR PROCESSING

(71) Applicant: TEXAS INSTRUMENTS INCORPORATED, Dallas, TX (US)

(72) Inventors: Sandeep Rao, Bangalore (IN); Karthik Ramasubramanian, Karnataka (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 520 days.

This patent is subject to a terminal disclaimer.

(21) Appl. No.: 16/107,000

(22) Filed: Aug. 21, 2018

(65) Prior Publication Data
US 2018/0372840 A1    Dec. 27, 2018

Related U.S. Application Data

(63) Continuation of application No. 14/855,057, filed on Sep. 15, 2015, now Pat. No. 10,078,131.

(51) Int. Cl.
*G01S 7/35* (2006.01)
*G01S 13/42* (2006.01)
(Continued)

(52) U.S. Cl.
CPC .............. *G01S 7/352* (2013.01); *G01S 13/42* (2013.01); *G01S 13/89* (2013.01); *G01S 13/931* (2013.01);
(Continued)

(58) Field of Classification Search
CPC ........ G01S 7/352; G01S 13/42; G01S 13/931; G01S 2013/9315; G01S 13/588; G01S 13/584; G01S 2007/356; G01S 13/89
See application file for complete search history.

(56) References Cited

U.S. PATENT DOCUMENTS 6,072,419 A    6/2000   Normant
6,670,907 B2   12/2003  Cho
(Continued)

FOREIGN PATENT DOCUMENTS

CN    1236110 A    11/1999
CN    1831558 A    9/2006
(Continued)

OTHER PUBLICATIONS

Notification of First JP Office Action; Office Action Translation; JP Application No. 2018-513779; email dated Jul. 7, 2020; 6 pages.
(Continued)

*Primary Examiner* — Matthew M Barker
(74) *Attorney, Agent, or Firm* — Ebby Abraham; Charles A. Brill; Frank D. Cimino

(57) ABSTRACT

The disclosure provides a radar apparatus. The radar apparatus includes a transmitter that transmits a first chirp. The first chirp is scattered by one or more obstacles to generate a first plurality of scattered signals. A plurality of receivers receives the first plurality of scattered signals. Each receiver of the plurality of receivers generates a digital signal in response to a scattered signal of the first plurality of scattered signals. A processor is coupled to the plurality of receivers and receives the digital signals from the plurality of receivers. The processor performs range FFT (fast fourier transform) and angle FFT on the digital signals received from the plurality of receivers to generate a first matrix of complex samples.

14 Claims, 4 Drawing Sheets

Figure 1:
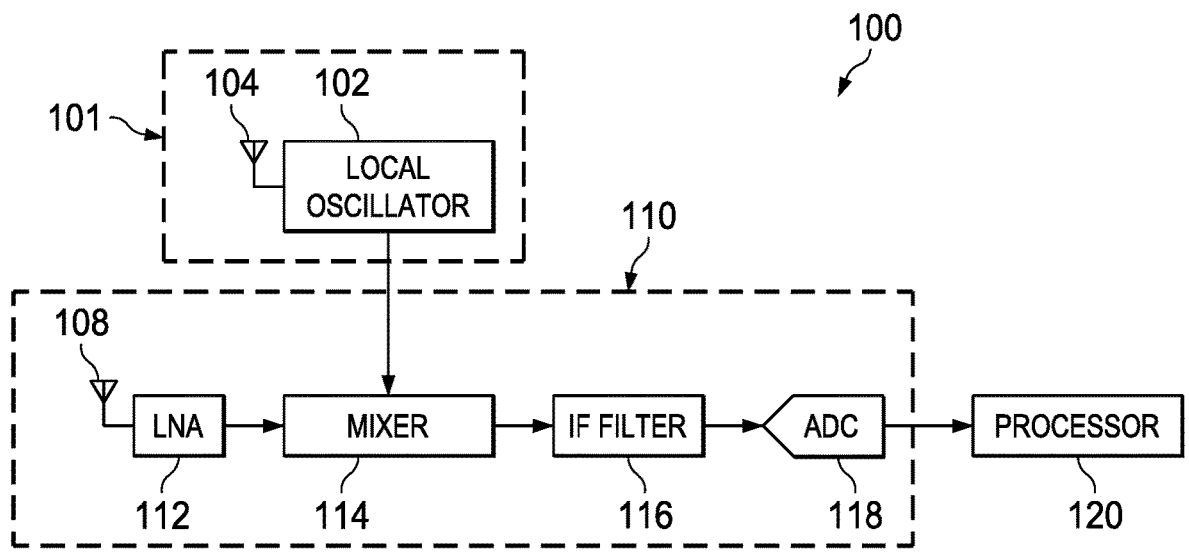

(51) Int. Cl.
*G01S 13/89* (2006.01)
*G01S 13/931* (2020.01)
*G01S 13/58* (2006.01)

(52) U.S. Cl.
CPC ............. *G01S 7/356* (2021.05); *G01S 13/584* (2013.01); *G01S 13/588* (2013.01); *G01S 2013/9315* (2020.01)

(56) References Cited

U.S. PATENT DOCUMENTS

| | | | |
|---|---|---|---|
| 6,903,678 B2 | 6/2005 | Kumon et al. | |
| 7,095,358 B2 | 8/2006 | Krikorian et al. | |
| 9,841,497 B2 | 12/2017 | Roger et al. | |
| 10,416,284 B2* | 9/2019 | Addison | ............... G01S 13/931 |
| 2004/0183713 A1 | 9/2004 | Kumon et al. | |
| 2005/0007269 A1 | 1/2005 | Carrara et al. | |
| 2005/0110675 A1 | 5/2005 | Gruener et al. | |
| 2006/0220949 A1 | 10/2006 | Nohmi | |
| 2007/0152873 A1 | 7/2007 | Hunt | |
| 2009/0085800 A1 | 4/2009 | Alland et al. | |
| 2009/0121926 A1 | 5/2009 | Ivenson | |
| 2011/0074620 A1 | 3/2011 | Wintermantel | |
| 2016/0131743 A1 | 5/2016 | Addison et al. | |
| 2016/0131744 A1 | 5/2016 | Addison et al. | |
| 2016/0282458 A1 | 9/2016 | Nugraha et al. | |
| 2016/0377711 A1* | 12/2016 | Arage | ................... G01S 13/343 342/118 |
| 2017/0254879 A1 | 9/2017 | Tokieda et al. | |
| 2019/0087009 A1* | 3/2019 | Rao | ......................... G06F 3/167 |
| 2019/0129002 A1* | 5/2019 | Roger | ................... G01S 7/2926 |
| 2019/0391251 A1* | 12/2019 | Bharadwaj, Jr. | ....... G01S 13/583 |
| 2020/0363518 A1* | 11/2020 | Rao | ........................ G01S 13/343 |

FOREIGN PATENT DOCUMENTS

| | | |
|---|---|---|
| CN | 101561970 A | 10/2009 |
| CN | 101971050 A | 2/2011 |
| CN | 103197317 A | 7/2013 |
| JP | 2011526373 A | 10/2011 |
| JP | 2014092458 A | 5/2014 |
| WO | 2015126505 | 8/2015 |

OTHER PUBLICATIONS

Detection of a guardrail buried in snow by FM-CW radar, Japan Society of Snow Engineering Bulletin, vol. 7, No. 1, Jan. 1991, pp. 2-8.

Notification of First CN Office Action; Chinese Patent Application No. 2016800472796; dated Jun. 22, 2021. 2pages.

First CN Office Action; Chinese Patent Application No. 2016800472796; dated Jun. 22, 2021.

First CN Office Action, Search Report; Chinese Patent Application No. 2016800472796; dated Jun. 22, 2021.

\* cited by examiner

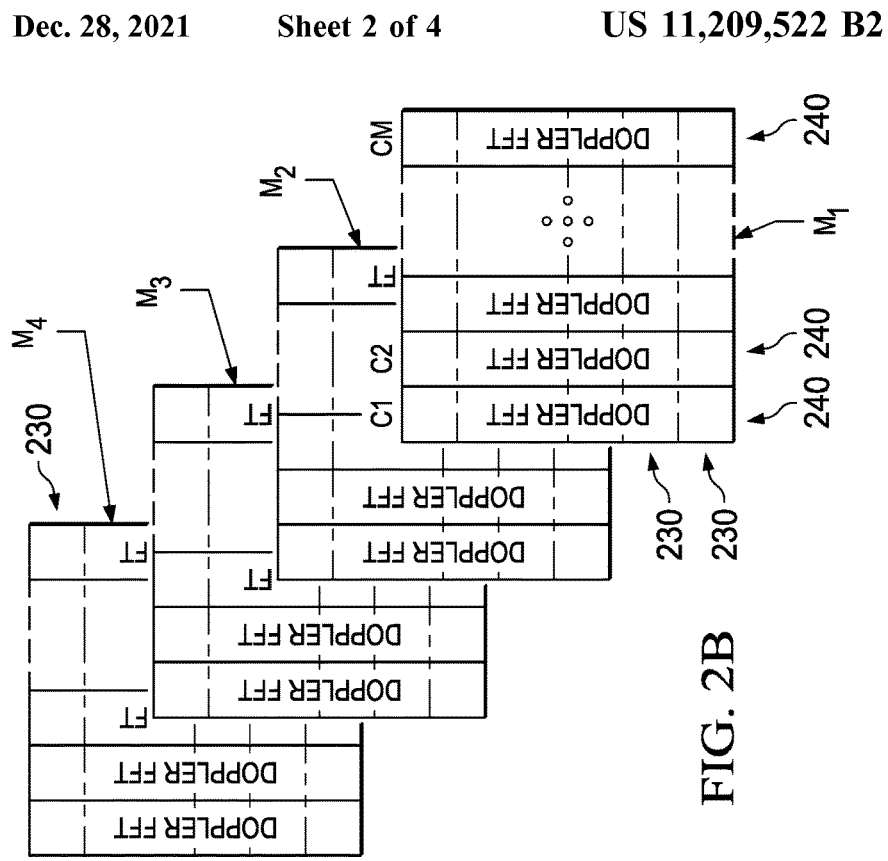
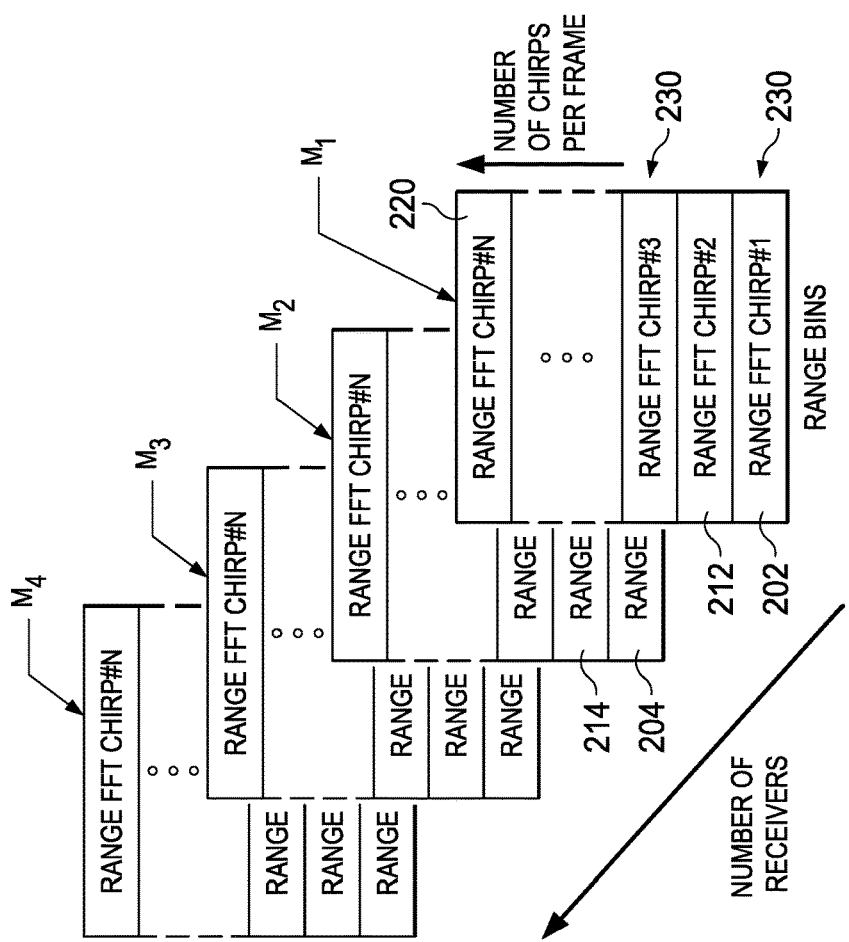
FIG. 2B
FIG. 2A

FIG. 4

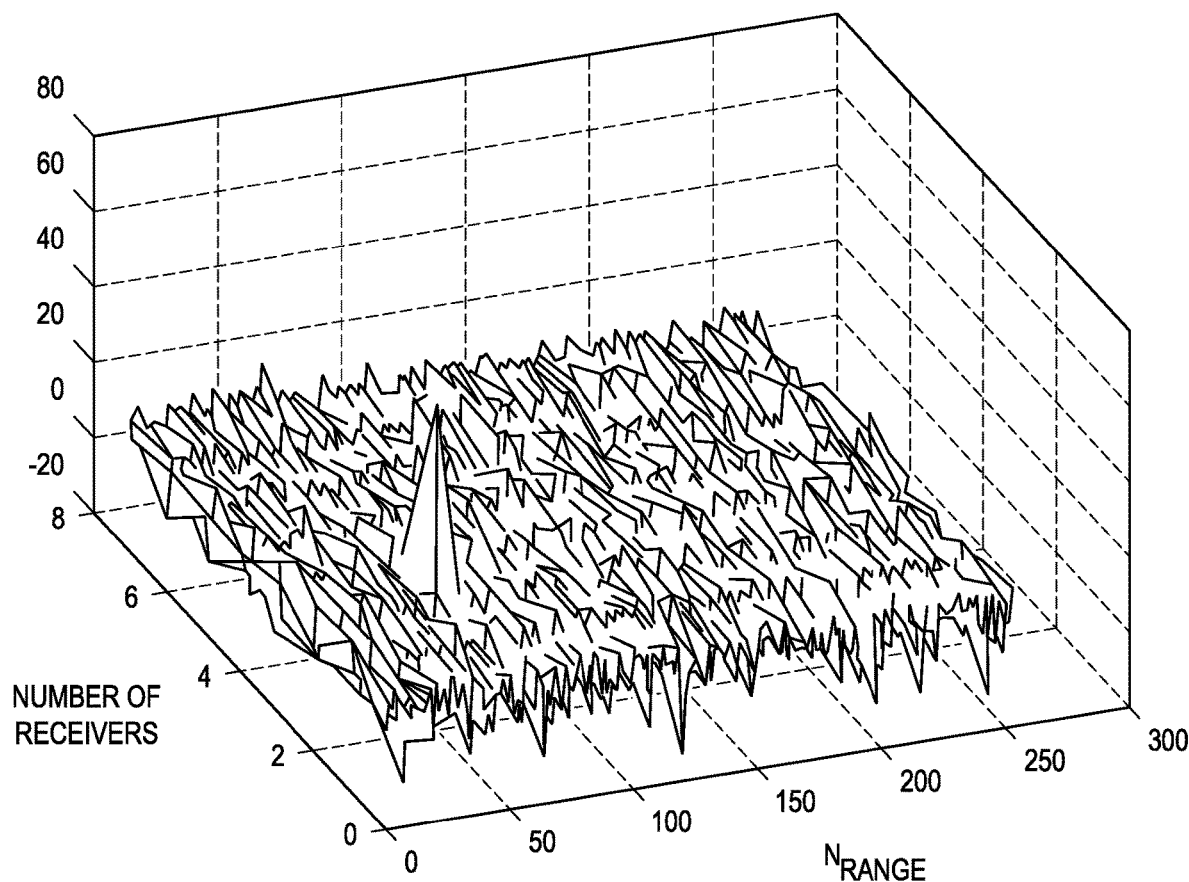

FIG. 5

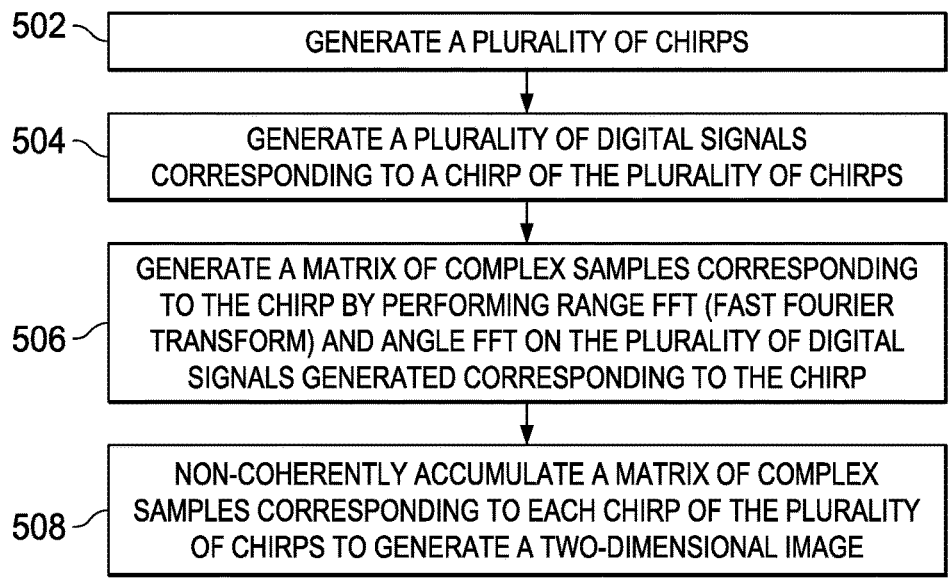

502 — GENERATE A PLURALITY OF CHIRPS

504 — GENERATE A PLURALITY OF DIGITAL SIGNALS CORRESPONDING TO A CHIRP OF THE PLURALITY OF CHIRPS

506 — GENERATE A MATRIX OF COMPLEX SAMPLES CORRESPONDING TO THE CHIRP BY PERFORMING RANGE FFT (FAST FOURIER TRANSFORM) AND ANGLE FFT ON THE PLURALITY OF DIGITAL SIGNALS GENERATED CORRESPONDING TO THE CHIRP

508 — NON-COHERENTLY ACCUMULATE A MATRIX OF COMPLEX SAMPLES CORRESPONDING TO EACH CHIRP OF THE PLURALITY OF CHIRPS TO GENERATE A TWO-DIMENSIONAL IMAGE

METHOD AND APPARATUS FOR FMCW RADAR PROCESSING

This application is a Continuation of application Ser. No. 14/855,057 filed Sep. 15, 2015.

TECHNICAL FIELD

The present disclosure is generally related to radars, and more particularly to optimizing memory requirement of radars.

BACKGROUND

The use of radars in automotive applications is evolving rapidly. Radar finds use in number of applications associated with a vehicle such as collision warning, blind spot warning, lane change assist, parking assist and rear collision warning. Pulse radar and FMCW (Frequency Modulated Continuous Wave) radar are predominately used in such applications.

In an FMCW radar, a local oscillator generates a frequency ramp segment by frequency modulating a transmit signal. The frequency ramp segment is also referred as a chirp. The frequency ramp segment is amplified and emitted by one or more transmit units. The frequency ramp segment is scattered by one or more obstacles to generate a scattered signal. The scattered signal is received by one or more receive units in the FMCW radar. A signal obtained by mixing the frequency ramp segment and the scattered signal is termed as an IF (intermediate frequency) signal. The frequency (f) of the IF signal is proportional to the distance (d) of the obstacle from the FMCW radar and also to the slope (S) of the frequency ramp segment.

The IF signal is sampled by an ADC (analog to digital converter). A sampled data generated by the ADC is processed by a processor to obtain a position and a velocity of the one or more obstacles. In one kind of FMCW radar, the processor performs FFT (fast fourier transform) based coherent processing on the sampled data. However, this conventional processing requires a large amount of memory in the processor. This adversely affects a size of the FMCW radar.

Some of the existing FMCW radars use known memory compression techniques to compress the data generated in FFT processing. However, these memory compression techniques are lossy in nature thereby resulting in degradation of an accuracy of the radar system. Another conventional approach of memory reduction is based on limiting a range of the FMCW radar that can be viewed in a single frame of FFT processing. Thus, multiple frames are transmitted by the transmit unit, and each frame is dedicated to a specific range. In this approach, since multiple frames are required for single viewing, it increases a power consumption of the FMCW radar, and also makes it difficult to use the FMCW radar in real time applications.

SUMMARY

According to an aspect of the disclosure, a radar apparatus is disclosed. The radar apparatus includes a transmitter that transmits a first chirp. The first chirp is scattered by one or more obstacles to generate a first plurality of scattered signals. A plurality of receivers receives the first plurality of scattered signals. Each receiver of the plurality of receivers generates a digital signal in response to a scattered signal of the first plurality of scattered signals. A processor is coupled to the plurality of receivers and receives the digital signals from the plurality of receivers. The processor performs range FFT (fast louder transform) and angle FFT on the digital signals received from the plurality of receivers to generate a first matrix of complex samples.

BRIEF DESCRIPTION OF THE VIEWS OF DRAWINGS

Figure 3A:
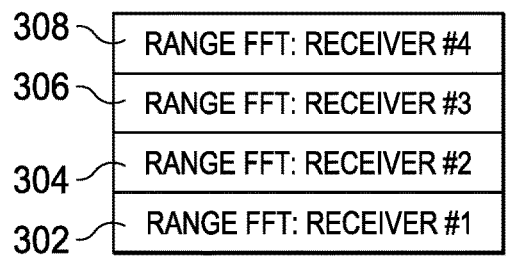
Figure 3B:
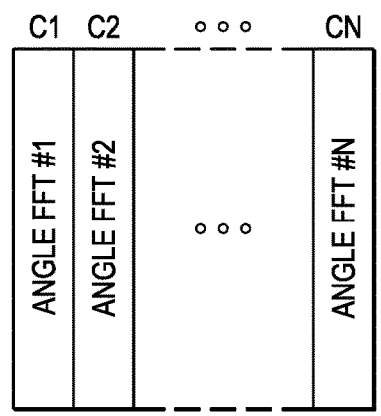
Figure 2C:
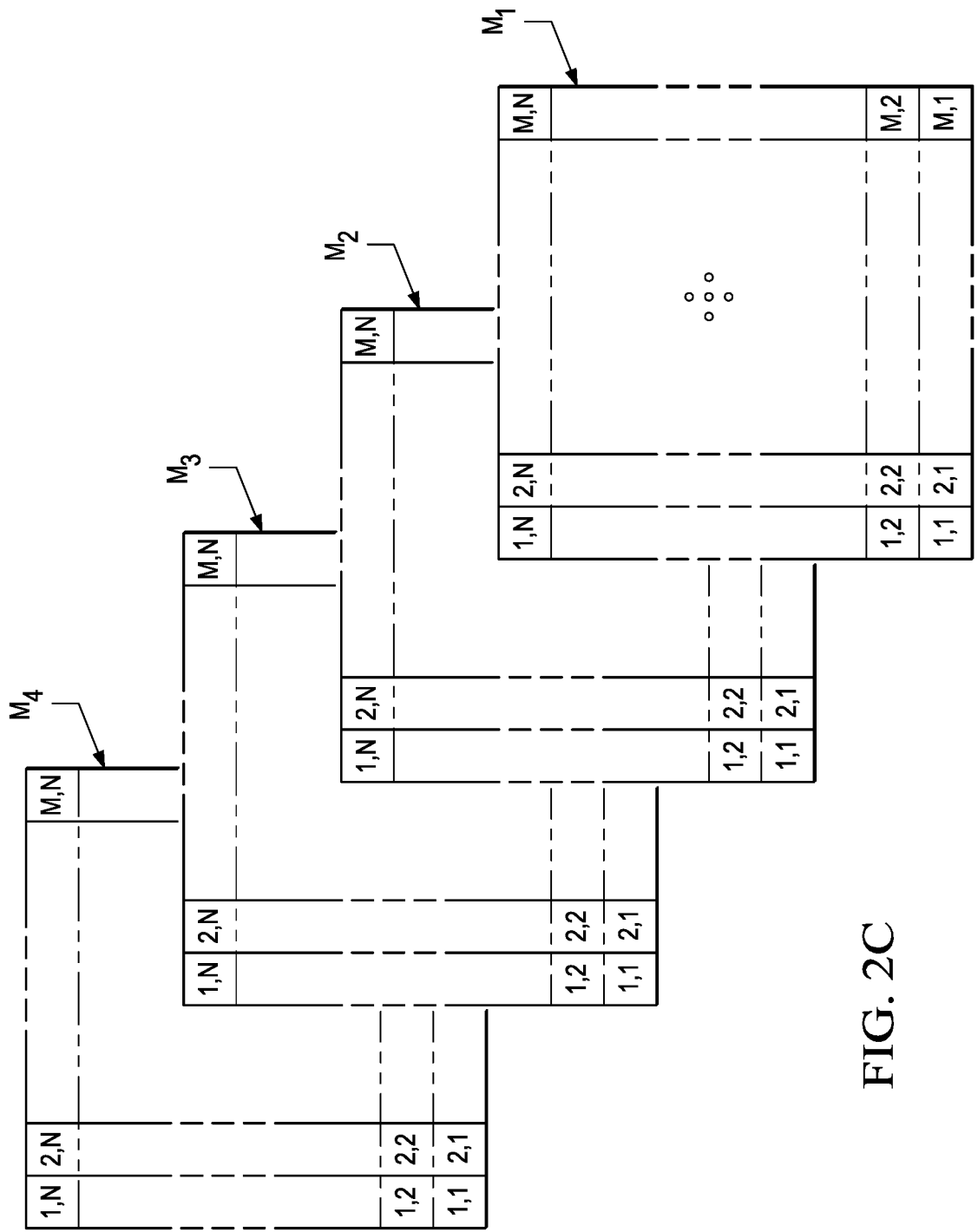

FIG. 1 illustrates a radar apparatus, according to an embodiment;

FIG. 2(a) to FIG. 2(c) illustrates FFT processing in a radar apparatus;

FIGS. 3(a) and 3(b) illustrates FFT processing in a radar apparatus, according to an embodiment;

FIG. 4 illustrates an image generated by a radar apparatus, according to an embodiment; and FIG. 5 is a flowchart to illustrate a method of operation of a radar apparatus, according to an embodiment.

DETAILED DESCRIPTION OF THE EMBODIMENTS

FIG. 1 illustrates a radar apparatus 100, according to an embodiment. The radar apparatus 100 includes a transmitter 101. The transmitter 101 includes a local oscillator 102 and a transmit antenna 104. The transmit antenna 104 is coupled to the local oscillator 102. In one version, a power amplifier is coupled between the local oscillator 102 and the transmit antenna 104. The radar apparatus 100 also includes a receiver 110. The receiver 110 includes a receive antenna 108, a low noise amplifier (LNA) 112, a mixer 114, an intermediate frequency (IF) filter 116 and an analog to digital converter (ADC) 118. The LNA 112 is coupled to the receive antenna 108. The mixer 114 is coupled to the LNA 112. The mixer 114 is also coupled to the local oscillator 102.

The IF filter 116 is coupled to the mixer 114. The ADC 118 is coupled to the IF filter 116. A processor 120 is coupled to the ADC 118. In one version, the radar apparatus 100 includes a plurality of receivers similar in connection and operation to the receiver 110. Each receiver of the plurality of receivers includes a receive antenna, a LNA, a mixer, an IF filter and an ADC. The ADC in each receiver of the plurality of receivers is coupled to the processor 120. In one example, the radar apparatus 100 includes a plurality of processors, and each receiver of the plurality of receivers is coupled to a processor of the plurality of processors. The radar apparatus 100 may include one or more additional components known to those skilled in the relevant art and are not discussed here for simplicity of the description.

The operation of the radar apparatus 100 illustrated in FIG. 1 is explained now. The local oscillator 102 generates a frequency ramp segment also referred as a chirp. In one example, a power amplifier is coupled between the local oscillator 102 and the transmit antenna 104. The chirp is amplified by the power amplifier, and provided to the transmit antenna 104. The transmit antenna 104 in the transmitter 101 transmits the chirp. The chirp is scattered by one or more obstacles to generate a plurality of scattered signals.

A scattered signal of the plurality of scattered signals is received by the receiver 110. The receive antenna 108 receives the scattered signal. The LNA 112 amplifies the scattered signal. The mixer 114 mixes the chirp generated by the local oscillator 102 and an amplified scattered signal received from the LNA 112. The mixer 114 generates an IF (intermediate frequency) signal. The IF signal is filtered by the IF filter 116 to generate a filtered IF signal. The ADC 118 samples the filtered IF signal to generate a digital signal.

In the above discussed example, when the radar apparatus 100 includes a plurality of receivers, each receiver of the plurality of receivers receives a scattered signal of the plurality of scattered signals and generates a digital signal. The plurality of scattered signals are generated corresponding to the chirp transmitted by the transmit antenna 104. Thus, the processor 120 receives digital signals from the plurality of receivers.

The digital signals are processed by the processor 120 to obtain a range and an angle of the one or more obstacles. The processor 120 performs FFT (fast fourier transform) on the digital signals. A peak in the FFT spectrum represents an obstacle, and a location of the peak in the FFT spectrum is proportional to a relative distance of the obstacle from the radar apparatus 100. The processing performed by the processor 120 is discussed later in the description in connection with FIG. 3(a) and FIG. 3(b).

FIG. 2(a) to FIG. 2(c) illustrates FFT processing in a radar apparatus. The FFT processing is explained in connection with the radar apparatus 100. The radar apparatus 100 transmit a plurality of chirps. A set of chirps form a frame. In an example, a frame includes N chirps, where N is an integer. A chirp of the N chirps is scattered by one or more obstacles to generate a plurality of scattered signals.

When the radar apparatus 100 includes a plurality of receivers, each receiver of the plurality of receivers receives a scattered signal of the plurality of scattered signals and generates a digital signal. Thus, the processor 120 receives digital signals from the plurality of receivers. The digital signals correspond to the chirp of the N chirps.

The processor 120 performs range FFT (fast fourier transform) or 1D FFT across each digital signal received from the plurality of receivers. A range FFT data generated by the processor 120 across plurality of receivers and across set of chirps is stored in a primary memory within the processor 120. This is illustrated in FIG. 2(a) for the case of four receivers.

FIG. 2(a) illustrates 4 matrices represented as M1, M2, M3 and M4 generated corresponding to the 4 receivers. These matrices are stored in the primary memory. A frame includes a first chirp, a second chirp to an $N^{th}$ chirp. The processor 120 receives digital signals from the four receivers corresponding to the first chirp (chirp #1). A first receiver generates a first digital signal for the first chirp (chirp #1). The processor 120 generates a range FFT data 202 corresponding to the first digital signal and stores it in matrix M1.

A second receiver generates a second digital signal for the first chirp (chirp #1). The processor 120 generates a range FFT data 204 corresponding to the second digital signal and stores it in matrix M2. Similarly, the processor 120 processes the digital signals received from a third receiver and a fourth receiver corresponding to the first chirp (chirp #1), and stores them in matrix M3 and matrix M4 respectively.

The first receiver generates a fifth digital signal for the second chirp (chirp #2). The processor 120 generates a range FFT data 212 corresponding to the fifth digital signal and stores it in matrix M1. The second receiver generates a sixth digital signal for the second chirp (chirp #2). The processor 120 generates a range FFT data 214 corresponding to the sixth digital signal and stores it in matrix M2. Similarly, the processor 120 processes the digital signals received from a third receiver and a fourth receiver corresponding to the second chirp (chirp #2), and stores them in matrix M3 and matrix M4 respectively.

In a similar manner, the processor 120 performs range FFT on the digital signals received corresponding to the $N^{th}$ chirp (chirp #N), and stores the range FFT data in the corresponding matrices. For example, the first receiver generates a digital signal corresponding to the $N^{th}$ chirp (chirp #N). The processor 120 generates a range FFT data 220 corresponding to the $N^{th}$ chirp and stores it in matrix M1. The range FFT resolves the one or more obstacles in range. A size of range FFT, in one example, is $N_{range}$.

Once a range FFT data corresponding to an entire frame is stored in the primary memory, the radar apparatus 100 performs a Doppler FFT or 2D FFT, as illustrated in FIG. 2(b). The Doppler FFT is performed across columns C1, C2 to CM, and a Doppler FFT data generated by the processor 120 is stored in Doppler bins illustrated as 240. In one example, the range FFT data is stored across rows of the primary memory (as illustrated in FIG. 2(a)), which are called as range bins and illustrated as 230. The Doppler FFT is performed across columns of the primary memory, and the Doppler FFT data is stored in the Doppler bins illustrated as 240 (as illustrated in FIG. 2(b)).

In another example, the range FFT data is stored across columns of the primary memory. Hence, the Doppler FFT is performed across rows of the primary memory. A size of the Doppler FFT, in one example, is $N_{doppler}$. $N_{doppler}$ is greater than a number of chirps per frame when zero-padding is performed in the Doppler FFT. The Doppler FFT resolves the one or more obstacles in Doppler.

After the processor 120 perform range FFT and Doppler FFT, each matrix includes multiple data bins, as illustrated in FIG. 2(c). For example, the matrix M1 includes data bins (1,1), (2,1) to (M,N). Similar data bins are created in matrices M2, M3 and M4. Subsequently, the processor 120 performs angle FFT on the data stored in the primary memory. The angle FFT is performed along corresponding elements of the matrices. Thus, an angle FFT is performed along M1(i,j), M2(i,j), M3(i,j), and M4(i,j). For example, an angle FFT is performed on following data bins M1(1,1), M2(1,1), M3(1,1) and M4(1,1).

The angle FFT is performed on all the data bins of the matrices M1 to M4. A size of the angle FFT, in one example, is $N_{angle}$. $N_{angle}$ is greater than a number of receivers in the radar apparatus 100 when zero-padding is performed in the angle FFT. This sequence of range FFT followed by Doppler FFT followed by the angle FFT resolves the one or more obstacles in a range, velocity and angle respectively. The processor 120 uses this sequence to determine range, velocity and angle of the one or more obstacles.

However, this FFT processing technique used by the processor 120 requires a large amount of primary memory. The number of samples that are required to be stored in the primary memory are $(N_{range}) \times (N_{doppler}) \times (N_{angle})$. In one example, this requires a size of 512 MB in the primary memory. A large primary memory adversely affects a size of the radar apparatus 100.

FIGS. 3(a) and 3(b) illustrates FFT processing in a radar apparatus, according to an embodiment. The FFT processing is explained in connection with the radar apparatus 100. The radar apparatus 100 transmit a plurality of chirps. A set of chirps form a frame. In an example, a frame includes N chirps, where N is an integer.

A frame includes a first chirp. The transmitter 101 in the radar apparatus 100 transmits the first chirp. The first chirp is scattered by one or more obstacles to generate a first plurality of scattered signals. A plurality of receivers similar to the receiver 110 in the radar apparatus 100 receives the first plurality of scattered signals. For the ease of understanding, the radar apparatus 100, in this example, includes 4 receivers, receiver #1, receiver #2, receiver #3 and receiver #4. Each of these receivers generates a digital signal in response to a scattered signal of the first plurality of scattered signals. Thus, the radar apparatus 100 generates a first plurality of digital signals in response to the first chirp. The processor 120 receives the first plurality of digital signals from the receivers, and performs range FFT (fast Fourier transform) on the plurality of digital signals to generate a matrix illustrated in FIG. 3(a) corresponding to the 4 receivers. The matrix is stored in the primary memory.

The processor 120 receives digital signals from the four receivers corresponding to the first chirp. A first receiver (receiver #1) generates a first digital signal for the first chirp. The processor 120 generates a range FFT data 302 corresponding to the first digital signal and stores it in the matrix.

A second receiver (receiver #2) generates a second digital signal for the first chirp. The processor 120 generates a range FFT data 304 corresponding to the second digital signal and stores it in the matrix. A third receiver (receiver #3) generates a third digital signal for the first chirp. The processor 120 generates a range FFT data 306 corresponding to the third digital signal and stores it in the matrix. A fourth receiver (receiver #4) generates a fourth digital signal for the first chirp. The processor 120 generates a range FFT data 308 corresponding to the fourth digital signal and stores it in the matrix.

The range FFT resolves the one or more obstacles in range. A size of range FFT, in one example, is $N_{range}$. Once a range FFT data corresponding to the first chirp is stored in the primary memory, the radar apparatus 100 performs an angle FFT or 3D FFT, as illustrated in FIG. 3(b).

The angle FFT is performed across columns C1, C2 to CN to generate a first matrix of complex samples. The processor 120 performs the angle FFT and stores the first matrix of complex samples in the primary memory. The first matrix of complex samples corresponds to the first chirp. In one example, the range FFT data is stored across rows of the primary memory (as illustrated in FIG. 3(a)). The angle FFT is performed across columns of the primary memory, and the first matrix of complex samples thus generated is stored in the primary memory (as illustrated in FIG. 3(b)).

In another example, the range FFT data is stored across columns of the primary memory. Hence, the angle FFT is performed across rows of the primary memory. A size of the angle FFT, in one example, is $N_{angle}$. This sequence of range FFT followed by the angle FFT resolves the one or more obstacles in a range and angle respectively. In one example, the processor 120 uses peak values in the matrix of complex samples to determine range, and angle of the one or more obstacles.

The processor 120 generates a first output data from the first matrix of complex samples. The first output data corresponds to the first chirp. In one example, the first output data is generated from a nonlinear operation on the first matrix of complex samples. The nonlinear operation is at least one of a modulus operation and a magnitude squared operation. In modulus operation, an absolute value is generated for each sample of the first matrix of complex samples. In the magnitude squared operation, a real and imaginary part of each sample of the first matrix of complex samples is squared and summed. The first output data is also in a form of a matrix. The processor 120 stores the first output data in a secondary memory.

In a similar manner discussed above, the processor 120 generates a second output data from a nonlinear operation on a second matrix of complex samples generated corresponding to a second chirp. The second chirp is transmitted by the transmit antenna 104 in the transmitter. The second chirp is scattered by the one or more obstacles to generate a second plurality of scattered signals. The plurality of receivers in the radar apparatus 100 receives the second plurality of scattered signals, and generates a second plurality of digital signals.

The processor 120 performs range FFT and angle FFT on the second plurality of digital signals to generate the second matrix of complex samples. The processor 120 generates the second output data from the second matrix of complex samples. In one version, the processor 120 non-coherently accumulates the first matrix of complex samples and the second matrix of complex samples to generate a two-dimensional image.

In another version, the processor 120 is configured to add the first output data stored in the secondary memory and the second output data to generate a two-dimensional image. This is illustrated in following equation:

$$B_{final} = B_{first} + B_{second} \qquad (1)$$

where, $B_{first}$ is the first output data, $B_{second}$ is the second output data, and $B_{final}$ is a final data obtained by adding the first output data stored in the secondary memory. $B_{final}$ is used the processor 120 to generate the two-dimensional image.

In yet another version, the processor 120 is configured to add a weighted average of the first output data and the second output data to generate a two-dimensional image. The two-dimensional image is stored in the secondary memory. The processor 120 determines a range and an angle of the one or more obstacles from the two-dimensional image. This is illustrated in following equation:

$$B_{final} = \alpha B_{first} + (1-\alpha) B_{second} \qquad (2)$$

where, $\alpha$ represents a weight.

The memory requirement by the processor 120 using the non-coherent accumulation technique is $N_{range} \times N_{angle} \times 2$ (where the factor of 2 is to account for both primary memory and the secondary memory). This is much lesser than the memory requirement discussed in connection with FIG. 2(a) to FIG. 2(c).

The FFT processing in the radar apparatus 100 is now explained when a plurality of chirps is transmitted by the transmitter 101. It is understood that the processing explained above with reference to the first chirp and the second chirp is aligned to the following description, when the plurality of chirps includes the first chirp and the second chirp.

The transmitter 101 in the radar apparatus 100 transmits the plurality of chirps. In an example, a frame includes N chirps, where N is an integer. The plurality of chirps are scattered by one or more obstacles to generate a plurality of scattered signals.

The radar apparatus 100 includes a plurality of receivers. The plurality of receivers receives the plurality of scattered signals. Each receiver of the plurality of receivers receives a scattered signal of the plurality of scattered signals and generates a digital signal. Thus, the processor 120 receives the digital signals from each receiver of the plurality of receivers. The digital signals correspond to a chirp of the plurality of chirps.

The processor 120 performs range FFT and angle FFT on the digital signals received from the plurality of receivers to generate a matrix of complex samples corresponding to the chirp. The processor 120 performs range FFT and angle FFT in a similar manner as discussed in connection with the first plurality of digital signals. The processor 120 non-coherently accumulates a matrix of complex samples corresponding to each chirp of the plurality of chirps to generate the two-dimensional image.

The processor 120 performs non-coherent accumulation in two ways. In a first way, the processor 120 generates an output data by performing a nonlinear operation on a matrix of complex samples generated corresponding to a chirp of the plurality of chirps. The output data is stored in the secondary memory. The processor 120 updates the secondary memory by adding the output data and a data from performing a nonlinear operation on a matrix of complex samples generated corresponding to each chirp of the plurality of chirps. The nonlinear operation is at least one of a modulus operation and a magnitude squared operation. A final data is generated by updating the output data. The processor generates the two-dimensional image from the final data. This is illustrated by the following equations. The non-linear operation used for this illustration is the modulus operation in which an absolute value of the matrix of complex samples is considered. For example, initially an output data S0 is stored in secondary memory, and the processor 120 adds an absolute value of a matrix of complex samples |x1| generated corresponding to a first chirp. In one example, the output data S0 is initialized to zero. The final data is given as:

$$S1 = S0 + |x1| \quad (3)$$

When the processor 120 adds an absolute value of a matrix of complex samples |x2| generated corresponding to a second chirp, the final data is given as:

$$S2 = S1 + |x2| \quad (4)$$

Thus, when the processor 120 adds an absolute value of a matrix of complex samples |xn| generated corresponding to an $N^{th}$ chirp, where N is an integer, the final data is given as:

$$SN = S(N-1) + |xn| \quad (5)$$

In a second way, the processor 120 generates an output data from a nonlinear operation performed on a matrix of complex samples generated corresponding to a chirp of the plurality of chirps. The output data is stored in the secondary memory. The processor 120 updates the secondary memory by sequentially adding a weighted average of the output data and a data from performing a nonlinear operation on a matrix of complex samples generated corresponding to each chirp of the plurality of chirps. A final data is generated by updating the output data. The processor generates the two-dimensional image from the final data. This is illustrated by the following equations. The non-linear operation used for this illustration is the modulus operation in which an absolute value of the matrix of complex samples is considered. For example, initially an output data S0 is stored in secondary memory. In one example, the output data S0 is initialized to zero. The final data is given as:

$$S1 = \alpha S0 + (1-\alpha)|x1| \quad (6)$$

where, α is a weight

When the processor 120 adds an absolute value of a matrix of complex samples |x2| generated corresponding to a second chirp, the final data is given as:

$$S2 = \alpha S1 + (1-\alpha)|x2| \quad (7)$$

Thus, when the processor 120 adds an absolute value of a matrix of complex samples |xn| generated corresponding to a $N^{th}$ chirp, where N is an integer, the final data is given as:

$$SN = \alpha S(N-1) + (1-\alpha)|xn| \quad (8)$$

The processor 120 determines a range and an angle of the one or more obstacles from the two-dimensional image corresponding to the final data. The non-coherent accumulation of data across multiple chirps, as described above, serves to increase signal to noise ratio (SNR) of the radar apparatus 100. In one example, the processor 120 non-coherently accumulates data (in the secondary memory) corresponding to the N chirps in a frame, and then performs determination of the range and the angle of the one or more obstacles.

In another example, the processor 120 non-coherently accumulates data (in the secondary memory) corresponding to a defined number of chirps, and then performs determination of the range and the angle of the one or more obstacles. This feature is useful when continuous chirps are transmitted by the transmitter 101.

In addition, a velocity of the obstacles can be measured by using difference in range of an obstacle across consecutive frames.

FIG. 4 illustrates an image generated by a radar apparatus, according to an embodiment. The image is generated by the radar apparatus 100 using the FFT processing described in connection with FIGS. 3(*a*) and 3(*b*). The FIG. 4 illustrates that the radar apparatus includes 8 receivers, and there are 256 samples per chirp ($N_{range}$=256).

The FIG. 4 is a plot to represent a final data (SN) after non-coherent accumulation of 64 chirps in a frame. The figure illustrates a peak occurring at $N_{range}$ of 50, and angle index of 2. For a radar apparatus 100 with a range resolution of 4 cm, the $N_{range}$ of 50 corresponds to a range of 50×4=200 cm. Likewise the angle index of 2, corresponds to an azimuth angle of sin(2*2/Number of receivers)=30 degrees.

FIG. 5 is a flowchart to illustrate a method of operation of a radar apparatus, according to an embodiment. At step 502, a plurality of chirps is generated. In an example, a frame includes N chirps, where N is an integer. At step 504, a plurality of digital signals is generated corresponding to a chirp of the plurality of chirps. The plurality of chirps are scattered by one or more obstacles to generate, for each chirp, a plurality of scattered signals. For example, the radar apparatus 100, illustrated in FIG. 1, includes a plurality of receivers. For each chirp, the plurality of receivers receives the plurality of scattered signals. Each receiver of the plurality of receivers receives a scattered signal of the plurality of scattered signals and generates a digital signal.

At step 506, a matrix of complex samples corresponding to the chirp is generated by performing range FFT (Fast fourier transform) and angle FFT on the plurality of digital signals generated corresponding to the chirp. A processor, for example the processor 120 illustrated in FIG. 1, receives the digital signals from each receiver of the plurality of receivers. The digital signals correspond to the chirp of the plurality of chirps. The processor performs range FFT and angle FFT on the digital signals received from the plurality of receivers to generate a matrix of complex samples corresponding to the chirp.

At step 508, a matrix of complex samples corresponding to each chirp of the plurality of chirps is non-coherently accumulated to generate a two-dimensional image. The processor determines a range and an angle of the one or more obstacles from the two-dimensional image. The non-coherent accumulation of data across multiple chirps serves to increase signal to noise ratio (SNR) of the radar apparatus.

The foregoing description sets forth numerous specific details to convey a thorough understanding of the invention.

However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A radar apparatus comprising:
    a transmitter configured to transmit a plurality of chirps;
    a plurality of receivers, each receiver configured to receive scattered signals for each chirp and generate a digital signal in response to a scattered signal for each chirp; and
    a processor comprising primary memory and secondary memory, and coupled to the plurality of receivers to receive the digital signals, the processor configured to:
        perform range FFT (fast Fourier transform) and angle FFT on the digital signals corresponding to a first chirp to generate a first matrix of complex samples and store the first matrix of complex samples in the primary memory;
        perform a nonlinear operation on the first matrix of complex samples to generate a first output data corresponding to first chirp and store the first output data in the secondary memory;
        perform range FFT and angle FFT on the digital signals corresponding to a second chirp to generate a second matrix of complex samples and store the second matrix of complex samples in the primary memory;
        perform the nonlinear operation on the second matrix of complex samples to generate a second output data corresponding to the second chirp; and
        non-coherently accumulate the second output data with the first output data in the secondary memory to generate a two dimensional image.

2. The radar apparatus of claim 1, wherein the processor is further configured to add the first output data and the second output data to generate the two-dimensional image.

3. The radar apparatus of claim 1, wherein the processor is further configured to add a weighted average of the first output data and the second output data to generate the two-dimensional image.

4. The radar apparatus of claim 1, wherein the processor is further configured to determine a range and an angle of the one or more obstacles from the two-dimensional image.

5. The radar apparatus of claim 1, wherein the transmitter comprises:
    a local oscillator configured to generate the first chirp; and
    a transmit antenna coupled to the local oscillator and configured to transmit the first chirp.

6. The radar apparatus of claim 1, wherein plurality of receivers comprises:
    a plurality of receive antennas, each configured to receive the scattered signal of the plurality of scattered signals;
    a plurality of low noise amplifiers (LNAs) each configured to amplify the scattered signal to generate an amplified scattered signal;
    a mixer coupled to each of the LNAs and to a local oscillator, the mixer configured to mix the amplified scattered signal and the first chirp to generate an IF (intermediate frequency) signal;
    an IF filter coupled to the mixer and configured to generate a filtered IF signal from the IF signal; and
    an ADC (analog to digital converter) coupled to the IF filter and configured to sample the filtered IF signal to generate the digital signal.

7. The radar apparatus of claim 1, wherein the non-linear operation is a modulus operation.

8. The radar apparatus of claim 1, wherein the non-linear operation is a magnitude squared operation.

9. A method comprising:
    generating a first plurality of digital signals, each of the first plurality of digital signals corresponding to a scattered first chirp received at an associated one of a plurality of receivers;
    performing range and azimuth fast Fourier transforms (FFTs) on the first plurality of digital signals;
    storing results of the range and azimuth FFTs on the first plurality of digital signals as complex signals in a primary memory;
    performing a nonlinear operation on the complex signals corresponding to the FFTs of the first plurality of digital signals to generate first output data;
    storing the first output data in a secondary memory;
    generating a second plurality of digital signals, each corresponding to a scattered second chirp received at an associated one of the plurality of receivers;
    performing range and azimuth FFTs on the second plurality of digital signals;
    storing results of the range and azimuth FFTs on the second plurality of digital signals as complex signals in the primary memory;
    performing the nonlinear operation on the complex signals corresponding to the FFTs of the first plurality of digital signals to generate second output data;
    non-coherently accumulating the second output data with the first output data in the secondary memory to generate a two-dimensional image.

10. The method of claim 9, wherein non-coherently accumulating the matrix of complex samples comprises:
    updating contents of the secondary memory by adding the first output data and the second output data to generate final data; and
    generating the two-dimensional image from the final data.

11. The method of claim 10, wherein the adding step comprises:
    adding a weighted average of the first output data and the second output data wherein a final data is generated.

12. The method of claim 10, further comprising:
    for at least one additional chirp, repeating the steps of generating a plurality of digital signals, performing range and azimuth FFTs, storing results of the range and azimuth FFTs, performing the nonlinear operation, and non-coherently accumulating;
    wherein the final data is generated by the non-coherently accumulating step for the at least one additional scattered chirp.

13. The method of claim 9, wherein the non-linear operation is a modulus operation.

14. The method of claim 9, wherein the non-linear operation is a magnitude squared operation.

* * * * *